INVENTOR.
Louis Petersen

United States Patent Office 2,841,384
Patented July 1, 1958

2,841,384

METHOD AND APPARATUS FOR COOLING MATERIALS BY GAS

Louis Petersen, Rye, N. Y., assignor to F. L. Smidth & Co., New York, N. Y., a corporation of New Jersey Application December 23, 1954, Serial No. 477,341

5 Claims. (Cl. 263—32)

This invention relates to the cooling of hot materials, such as are produced in a burning operation in a kiln, and is concerned more particularly with a novel method for effecting rapid and uniform cooling of such materials by means of gases and with apparatus for the practice of the method. The method and apparatus of the invention may be employed in the cooling of various materials but offer especial advantages in the treatment of cement clinker produced in a rotary kiln. That application of the invention will, accordingly, be illustrated and described in detail for purposes of explanation.

Cement clinker discharged from a kiln is of high temperature, which may be of the order of 2000° F., and must be cooled before it can be subjected to later operations. Such cooling may be effected by passing air through a bed of the clinker, but, if the clinker contains lumps of substantial size as well as the usual relatively small pieces, it is difficult to cool the lumps in an apparatus, which is satisfactory for the cooling of the small pieces.

The present invention is directed to the provision of a method and apparatus, by the use of which a hot material made up of pieces varying considerably in size can be rapidly cooled. In the cooling operation of the invention, the material is first partially cooled by contact with a gas and thereafter the coarse or oversize pieces are separated from the remaining fine pieces and crushed. The crushed product is then combined with the fine pieces and the combined material is carried along in suspension in a gas stream to a separator, in which the solids are separated from the gas. In its travel with the gas stream, the material gives up heat to the gas and, since the larger pieces of the material have been broken up by the crusher, the material may be rapidly and uniformly cooled.

Figure 1:
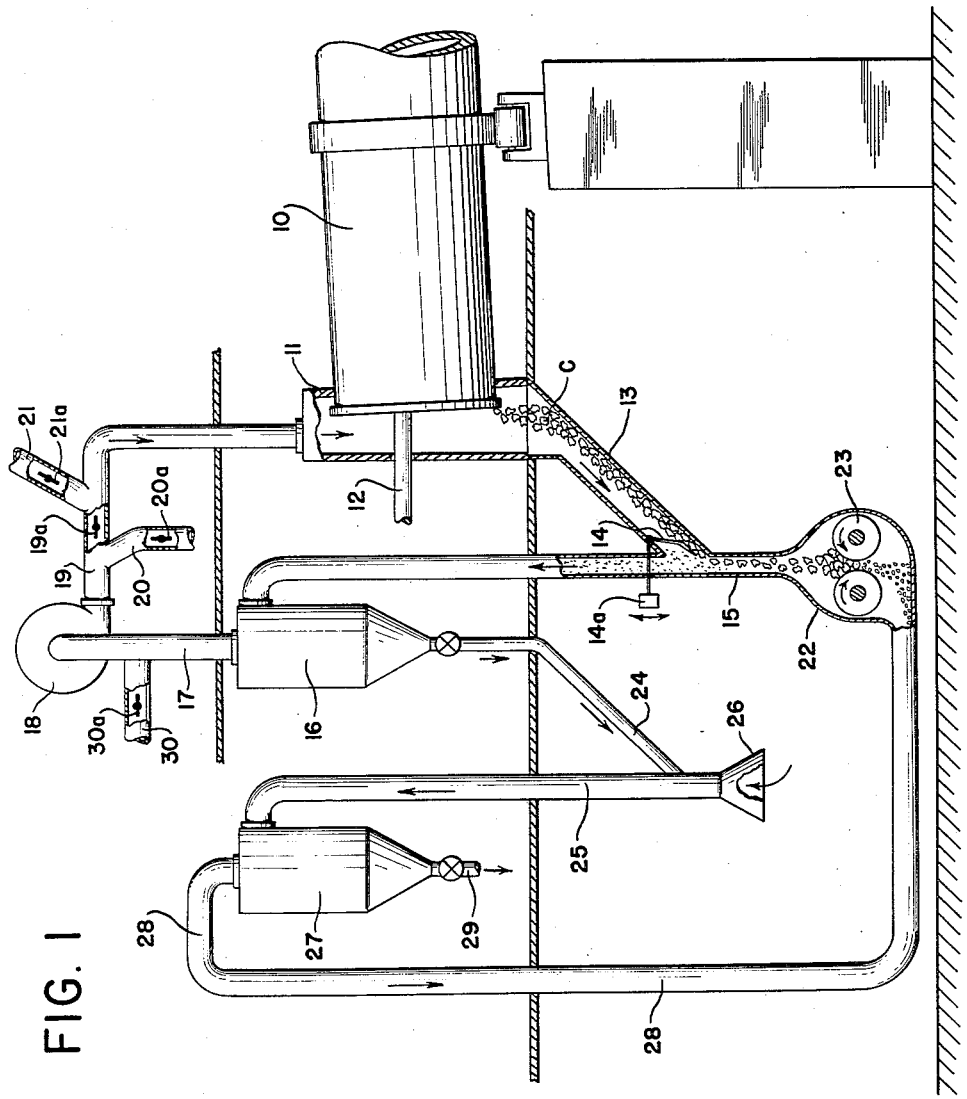
Figure 2:
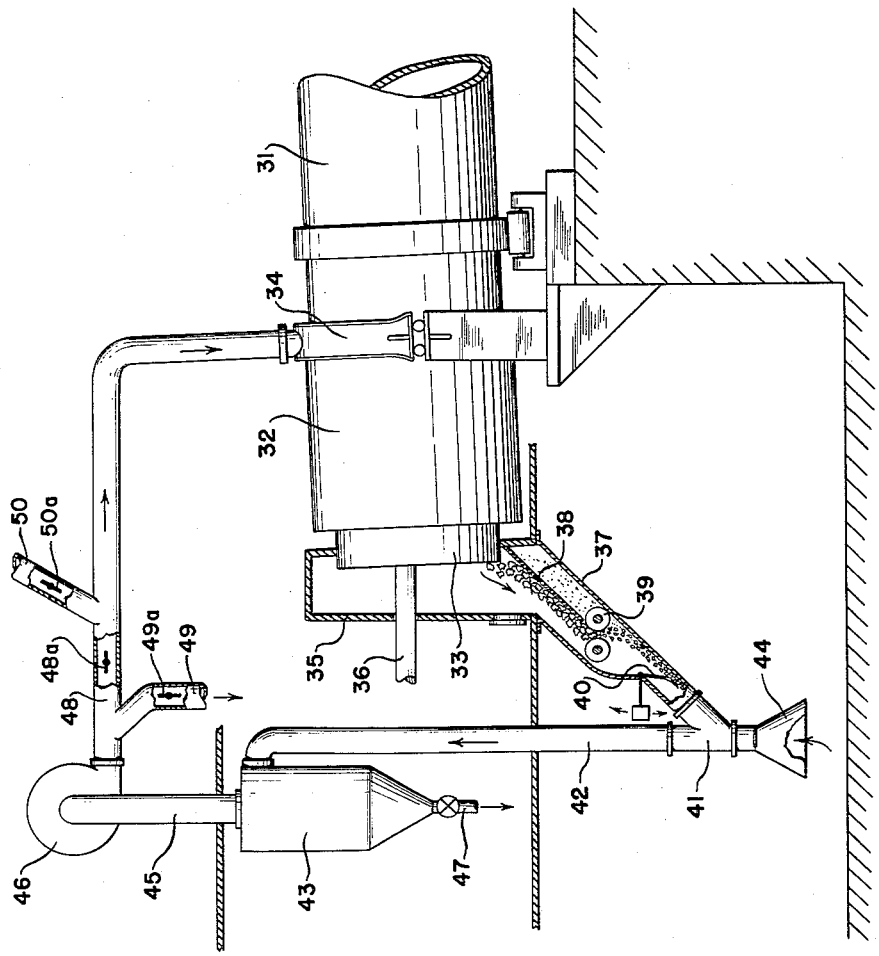

For a better understanding of the invention, reference may be made to the accompanying drawings, in which Fig. 1 is a diagrammatic elevational view with parts shown in section, of one form of apparatus for practicing the method of the invention; and Fig. 2 is a view similar to Fig. 1 of another form of the apparatus.

The installation illustrated in Fig. 1 includes a rotary kiln 10 of conventional construction with its lower end entering a hood 11, through which a burner tube 12 projects into the end of the kiln. The bottom of the hood has an outlet, from which a pipe or throat 13 extends in a generally downward direction, so that the pieces of clinker C discharging from the kiln flow down through the pipe by gravity. A flap gate 14 is pivotally mounted within pipe 13 near its lower end and is held by a weight 14a in contact with the layer of clinker traveling through the pipe, so as to reduce to a minimum the amount of air withdrawn through the pipe from the kiln hood and kiln.

The lower end of pipe 13 is connected to a riser pipe 15, which leads upwardly to the gas inlet of a cyclone separator 16. The separator is of conventional construction and has a gas outlet connected by a pipe 17 to the intake of a fan 18. The outlet of the fan is connected by a pipe 19 to an inlet into hood 11 and the pipe contains a damper 19a, by which the flow of air therethrough can be controlled. The air traveling through pipe 19 into hood 11 serves as secondary air of combustion within the kiln and a branch pipe 20 containing a damper 20a leads from pipe 19 and conducts air for use as primary air of combustion. A second branch 21 having a damper 21a may be connected to pipe 19 for discharge to the atmosphere of air not required for combustion purposes.

The pipe 15 extends upward from a chamber 22, which contains a crusher 23, illustrated as being of the roll type. Any other form of crusher suitable for crushing clinker may be substituted for the roll crusher and the crusher employed is preferably one having working parts which can be internally cooled by a cooling medium.

A pipe 24 leads downwardly from the solids outlet of separator 16 to a riser pipe 25 having an air intake 26 at its lower end. Pipe 25 leads to the inlet of a cyclone separator 27, the gas outlet of which is connected by a pipe 28 to chamber 22 below crusher 23. A pipe 29 leads from the solids outlet of separator 27 to a desired point of discharge of the separated cooled clinker.

In the operation of the apparatus described, the hot clinker discharging from kiln 10 into hood 11 travels down through pipe 13 and enters a stream of air passing upwardly through pipe 15. The discharge of the clinker into the air stream results in a separation of a fine fraction, which is carried along in the air stream and enters the cyclone separator 16, and a coarse fraction, which falls through the air stream and enters chamber 22. During the fall of the material, it is partially cooled in the air stream and, in chamber 22, it is broken up by the crusher 23. The crushed material is carried out of chamber 22 with the air stream traveling through the chamber from pipe 28 to pipe 15 and the crushed material is combined with the fine fraction and enters separator 16. The solids separated from the gas in the separator are discharged from the bottom outlet of the separator and conducted by pipe 24 into the air stream rising through pipe 25. The material is carried along in the air stream into separator 27, where the solids are separated from the gas.

In the apparatus illustrated, the large pieces of clinker, which are difficult to cool, are broken up in the crusher after being partially cooled by downward travel through pipe 15. The crushed product and the fine fraction carried upwardly through pipe 15 are cooled by giving up heat to the air stream and, after separation from the stream in separator 16, the clinker undergoes a second stage of cooling as it is carried with the air stream through pipe 25. The air used for cooling is heated in two stages and such hot air may then be employed for both primary and secondary air of combustion. The air entering the fan is of high temperature and the fan is made of appropriate metals to withstand such temperature. If desired, further protection for the fan may be provided by means of a branch pipe 30 connected to pipe 17 and containing a damper 30a, which is thermostatically controlled in response to the temperature of the air in pipe 17 and admits atmospheric air to reduce the temperature of the gas stream entering the fan.

The kiln installation shown in Fig. 2 includes a kiln 31, on the lower end of which is mounted a recuperator 32. Clinker discharging from the kiln passes through the recuperator and is partially cooled by air, the air then entering the kiln for use as secondary air of combustion. Such recuperators are well known and a typical recuperator suitable for the purpose is that illustrated in Narsted and Lindhard Patent 2,268,296, issued December 30, 1941. Such a recuperator has a clinker discharge section 33 and it is surrounded by a wind box 34, through which air is admitted to its interior.

The recuperator discharge section 33 enters a kiln hood 35, through which a burner 36 projects, and the hood has a bottom opening, from which a chamber 37 extends in a generally downward direction. A screen 38 leads downwardly at an incline from the interior of hood 35 into chamber 37 and a crusher 39 is mounted in the chamber at the lower end of the screen. Below the crusher, the chamber contains a weighted flap gate 40, which bears against clinker traveling down by gravity through chamber 37 and is similar in construction and operation to gate 14. The lower end of chamber 37 is connected through a suitable fitting 41 to a riser pipe 42 leading upwardly to the inlet of a cyclone separator 43. An air intake 44 is connected to the lower end of fitting 41. The gas outlet of separator 43 is connected by a pipe 45 to the inlet of a fan 46, while a discharge pipe 47 leads from the solids outlet of the separator.

A pipe 48 containing a damper 48a leads from the gas outlet of the separator to wind box 34 and thus supplies air to the clinker within the recuperator. A branch pipe 49 containing a damper 49a leads from pipe 48 and delivers air to be used as primary air of combustion. Another branch 50 containing a damper 50a leads from pipe 48 and may be employed to discharge air to the atmosphere.

In the operation of the apparatus shown in Fig. 2, the clinker issuing from kiln 31 enters the recuperator 32 where it is partially cooled by air delivered by fan 46. The clinker leaving the recuperator is discharged upon screen 38 and thereby separated into a fine fraction and a coarse fraction. The coarse fraction moves along the screen to the crusher 39 where it is broken up, while the fine fraction passing through the screen by-passes the crusher. The fine and crushed fractions are combined below the crusher and enter the fitting 41 where the material is picked up in the air stream traveling upward through pipe 42. The material receives a second stage of cooling while moving in suspension to the separator 43 where the clinker is separated from the air and the latter drawn off for use in the recuperator and for primary air of combustion.

In the practice of the method of the invention in both forms of the apparatus, the clinker discharging from the kiln is partially cooled and the separation into fine and coarse fractions is then effected. In the apparatus of Fig. 1, the separation results from the discharge of the material into the upwardly moving air stream in pipe 15, which carries away the fine material and permits the coarse to fall into chamber 22. In the apparatus shown in Fig. 2, the separation of the partially cooled clinker into fine and coarse fractions is accomplished by means of screen 38. Following the separation of the material, the coarse fraction is crushed and the crushed product and fine fraction are combined and carried along in suspension for additional cooling. In the apparatus of Fig. 1, such cooling occurs in two stages with cyclone separators 16 and 29 at the ends of the respective stages. In the apparatus of Fig. 2, the cooling in the recuperator is so effective that only a single stage of cooling of the material in suspension is necessary.

I claim:

1. Apparatus for cooling hot material of different particle sizes which comprises a conduit system, means for maintaining a flowing gas stream in said conduit system, said system including an upwardly-extending conduit, crushing means located in said upwardly-extending conduit, means for introducing the material to be cooled into said upwardly-extending conduit downstream of said crushing means in the direction of gas flow, whereby material introduced into said upwardly-extending conduit initially will be separated by said gas stream into a fine fraction which is carried along with the gas stream and a coarse fraction which will pass downwardly to said crushing means and be crushed thereby and the crushed particles then will be entrained in the gas stream and subsequently mixed with said initially separated fine fraction, and means in said conduit system disposed downstream, in the direction of the flow of the gas, from the point of introduction of the material into said upwardly-extending conduit, for separating the material from the gas stream.

2. Apparatus for cooling hot material which comprises a conduit system including an upwardly-extending conduit, means for maintaining a flowing gas stream in said conduit system and upwardly through said upwardly-extending conduit, means for introducing the material to be cooled into said upwardly-extending conduit, means in the gas stream disposed upstream, in the direction of gas flow, from the point of introduction of the material into said upwardly-extending conduit for crushing material to a fineness to be entrained in the gas stream, whereby upon introduction of material into the conduit system, it is initially and partially cooled by the flowing gas stream, the heavier particles pass downwardly to the crusher and are crushed and the crushed particles are entrained in the gas stream, and means in said conduit system disposed downstream, in the direction of the flow of the gas, from the point of introduction of the material into said upwardly extending conduit, for separating the material from the gas stream.

3. A method of cooling hot material produced in a burning operation, which comprises partially cooling the material by advancing the material and passing a cool gas flowing in a different direction in contact with the material, separating the material into coarse and fine fractions, crushing the coarse fraction of the partially cooled material, combining the crushed product with the fine fraction of the partially cooled material and simultaneously carrying the combined material along in suspension in a stream of cool gas, and separating the material from the gas stream, the partial cooling of the material and the separation of the fine fraction from the coarse fraction being effected by introducing the material into an upwardly flowing stream of the gas, the coarse fraction falling through the stream being crushed, and the crushed product entering the stream to be mixed with the suspended fine fraction.

4. Apparatus for cooling hot material produced in a burning operation, which comprises means for partially cooling the material including means for advancing the material and causing it to pass in contact with a cool gas flowing in a different direction, means for maintaining a stream of cool gas and causing it to flow upwardly, means for separating the material into coarse and fine fractions comprising means for introducing the hot material into the upwardly-flowing gas stream so that the fine fraction will be carried upwardly in suspension in the stream and the coarse fraction will fall through the stream, means independent of said means for separating the material into coarse and fine fractions for crushing the coarse fraction of the partially cooled material and introducing the crushed product into the gas stream to be carried along thereby, the crushing means being disposed in the gas stream below the point of introduction of the material into the upwardly flowing gas stream, and means for separating the cooled material from the gas stream.

5. The apparatus of claim 4 which includes two separators, means for passing the gas stream in series through said separators, means for introducing the hot material into the gas stream upstream in the direction of gas flow, with respect to the first separator, whereby the crushed fraction will be carried along in suspension in the gas stream to the first separator, and means for introducing the solids separated from the first separator into the gas stream traveling toward the second separator to be carried along in the gas stream and separated therefrom in the second separator.

References Cited in the file of this patent

UNITED STATES PATENTS

| 2,235,683 | Horesi | Mar. 18, 1941 |
| 2,375,487 | Newhouse | May 8, 1945 |
| 2,446,551 | Pauley | Aug. 10, 1946 |